(12) United States Patent
Hyndman et al.

(10) Patent No.: US 8,806,354 B1
(45) Date of Patent: Aug. 12, 2014

(54) METHOD AND APPARATUS FOR IMPLEMENTING AN ELECTRONIC WHITE BOARD

(75) Inventors: Arn Hyndman, Ottawa (CA); Nicholas Sauriol, Ottawa (CA)

(73) Assignee: Avaya Inc., Basking Ridge, NJ (US)

( * ) Notice: Subject to any disclaimer, the term of this patent is extended or adjusted under 35 U.S.C. 154(b) by 628 days.

(21) Appl. No.: 12/344,414

(22) Filed: Dec. 26, 2008

(51) Int. Cl.
*G06F 3/00* (2006.01)
*H04L 29/06* (2006.01)

(52) U.S. Cl.
CPC .................................. *H04L 65/403* (2013.01)
USPC ............................ 715/753; 709/205; 709/204

(58) Field of Classification Search
CPC .................................................... H04L 65/403
USPC .................... 715/753; 709/205, 204
See application file for complete search history.

(56) References Cited

U.S. PATENT DOCUMENTS

| | | | | |
|---|---|---|---|---|
| 5,400,248 A | * | 3/1995 | Chisholm | 705/12 |
| 5,724,508 A | * | 3/1998 | Harple et al. | 709/205 |
| 5,819,084 A | * | 10/1998 | Shapiro et al. | 1/1 |
| 5,861,883 A | * | 1/1999 | Cuomo et al. | 715/733 |
| 5,864,874 A | * | 1/1999 | Shapiro | 1/1 |
| 5,911,045 A | * | 6/1999 | Leyba et al. | 709/204 |
| 5,923,307 A | * | 7/1999 | Hogle, IV | 345/4 |
| 5,940,082 A | * | 8/1999 | Brinegar et al. | 345/442 |
| 5,956,738 A | * | 9/1999 | Shirakawa | 715/273 |
| 5,999,208 A | * | 12/1999 | McNerney et al. | 348/14.08 |
| 6,119,147 A | * | 9/2000 | Toomey et al. | 709/204 |
| 6,189,116 B1 | * | 2/2001 | Mongan et al. | 714/38.14 |
| 6,195,091 B1 | * | 2/2001 | Harple et al. | 715/751 |
| 6,212,534 B1 | * | 4/2001 | Lo et al. | 715/205 |
| 6,425,525 B1 | * | 7/2002 | Swaminathan et al. | 235/385 |
| 6,687,876 B1 | * | 2/2004 | Schilit et al. | 715/231 |
| 6,809,843 B1 | * | 10/2004 | Youngers | 358/474 |
| 6,816,719 B1 | * | 11/2004 | Kronstrom et al. | 455/403 |
| 7,111,037 B1 | * | 9/2006 | Chesley et al. | 709/203 |
| 7,219,127 B2 | * | 5/2007 | Huck et al. | 709/204 |
| 7,242,421 B2 | * | 7/2007 | Center et al. | 348/14.1 |
| 7,313,827 B2 | * | 12/2007 | Kelley et al. | 726/28 |
| 7,324,691 B2 | * | 1/2008 | Li et al. | 382/181 |
| 7,352,902 B2 | * | 4/2008 | Li et al. | 382/206 |
| 7,367,048 B2 | * | 4/2008 | Kelley et al. | 726/2 |

(Continued)

OTHER PUBLICATIONS

_Indexed_Shapes—for that Hand-Drawn Look.*

*Primary Examiner* — Steven Sax
*Assistant Examiner* — David Choi
(74) *Attorney, Agent, or Firm* — Anderson Gorecki & Rouille LLP (57) ABSTRACT

An electronic whiteboard may be used alone or in a virtual environment. The electronic whiteboard has a palate of tools that enable users to quickly draw shapes on the whiteboard. Rather than using perfectly drawn shapes, however, the palate renders shapes that are not quite perfect—rectangles that are not quite square, lines that are not quite straight—to prevent users from focusing on getting the drawings perfect. This lends an informal feeling to the resulting drawings to allow the drawings to more closely simulate how drawings would appear on a traditional whiteboard. Similarly, text is rendered using a scripted font rather than type font to make words on the whiteboard appear to be hand-written. The electronic whiteboard enables users to add notes and to vote on objects. Automatic vote counting and note management is provided. Use of the whiteboard may be recorded to enable sessions to be replayed and snapshots to be obtained.

15 Claims, 5 Drawing Sheets

(56) References Cited

U.S. PATENT DOCUMENTS

| | | | |
|---|---|---|---|
| 7,379,968 B2 * | 5/2008 | Schuh | 709/204 |
| 7,516,179 B2 * | 4/2009 | Huck et al. | 709/204 |
| 7,593,023 B2 * | 9/2009 | Cazier et al. | 345/619 |
| 7,809,798 B2 * | 10/2010 | Chesley et al. | 709/213 |
| 7,844,998 B2 * | 11/2010 | Kelley et al. | 726/2 |
| 7,904,514 B2 * | 3/2011 | Lapstun et al. | 709/204 |
| 7,929,002 B2 * | 4/2011 | Shelton et al. | 715/718 |
| D658,203 S * | 4/2012 | Hally et al. | D14/488 |
| 8,164,595 B2 * | 4/2012 | Yabuki et al. | 345/440 |
| 8,539,381 B2 * | 9/2013 | Allyn et al. | 715/860 |
| 2002/0005847 A1 * | 1/2002 | Hiroi | 345/419 |
| 2002/0087592 A1 * | 7/2002 | Ghani | 707/500 |
| 2002/0147799 A1 * | 10/2002 | Alhalabi et al. | 709/220 |
| 2002/0163572 A1 * | 11/2002 | Center et al. | 348/14.08 |
| 2003/0061284 A1 * | 3/2003 | Mandarino et al. | 709/204 |
| 2004/0060037 A1 * | 3/2004 | Damm et al. | 717/104 |
| 2004/0070616 A1 * | 4/2004 | Hildebrandt et al. | 345/764 |
| 2004/0128350 A1 * | 7/2004 | Topfl et al. | 709/204 |
| 2004/0130566 A1 * | 7/2004 | Banerjee et al. | 345/716 |
| 2004/0181579 A1 * | 9/2004 | Huck et al. | 709/205 |
| 2005/0010799 A1 * | 1/2005 | Kelley et al. | 713/200 |
| 2005/0010823 A1 * | 1/2005 | Kelley et al. | 713/202 |
| 2005/0063592 A1 * | 3/2005 | Li et al. | 382/181 |
| 2005/0063594 A1 * | 3/2005 | Li et al. | 382/206 |
| 2005/0198578 A1 * | 9/2005 | Agrawala et al. | 715/750 |
| 2005/0273510 A1 * | 12/2005 | Schuh | 709/225 |
| 2006/0026264 A1 * | 2/2006 | Chesley et al. | 709/218 |
| 2006/0059431 A1 * | 3/2006 | Pahud | 715/751 |
| 2006/0092178 A1 * | 5/2006 | Tanguay et al. | 345/629 |
| 2006/0167996 A1 * | 7/2006 | Orsolini et al. | 709/204 |
| 2006/0274906 A1 * | 12/2006 | Jia et al. | 381/119 |
| 2006/0277255 A1 * | 12/2006 | Orsolini et al. | 709/205 |
| 2007/0024631 A1 * | 2/2007 | Cazier et al. | 345/581 |
| 2007/0124325 A1 * | 5/2007 | Moore et al. | 707/102 |
| 2007/0134644 A1 * | 6/2007 | Jones et al. | 434/365 |
| 2007/0153017 A1 * | 7/2007 | Toyama et al. | 345/582 |
| 2007/0185958 A1 * | 8/2007 | Huck et al. | 709/204 |
| 2007/0185959 A1 * | 8/2007 | Huck et al. | 709/204 |
| 2007/0229652 A1 * | 10/2007 | Center et al. | 348/14.08 |
| 2007/0255788 A1 * | 11/2007 | Troung | 709/205 |
| 2008/0043943 A1 * | 2/2008 | Sipher et al. | 379/88.22 |
| 2008/0046986 A1 * | 2/2008 | Pinkas et al. | 726/6 |
| 2008/0059484 A1 * | 3/2008 | Packard et al. | 707/10 |
| 2008/0059914 A1 * | 3/2008 | Allyn et al. | 715/859 |
| 2008/0147679 A1 * | 6/2008 | Kelley et al. | 707/10 |
| 2008/0262911 A1 * | 10/2008 | Altberg et al. | 705/14 |
| 2009/0017313 A1 * | 1/2009 | Outlaw et al. | 428/446 |
| 2009/0024935 A1 * | 1/2009 | Lapstun et al. | 715/753 |
| 2009/0040194 A1 * | 2/2009 | Shelton et al. | 345/179 |
| 2009/0102847 A1 * | 4/2009 | Yabuki et al. | 345/440 |
| 2009/0174530 A1 * | 7/2009 | Yen et al. | 340/10.52 |
| 2009/0222744 A1 * | 9/2009 | Renner | 715/757 |
| 2009/0309831 A1 * | 12/2009 | Sun et al. | 345/158 |
| 2010/0001951 A1 * | 1/2010 | Yen et al. | 345/157 |
| 2010/0100866 A1 * | 4/2010 | Kamper et al. | 717/105 |
| 2010/0131868 A1 * | 5/2010 | Chawla et al. | 715/759 |
| 2010/0241507 A1 * | 9/2010 | Quinn et al. | 705/14.42 |
| 2011/0004658 A1 * | 1/2011 | Chesley et al. | 709/203 |
| 2011/0074915 A1 * | 3/2011 | Ferren et al. | 348/14.11 |

* cited by examiner

METHOD AND APPARATUS FOR IMPLEMENTING AN ELECTRONIC WHITE BOARD

CROSS-REFERENCE TO RELATED APPLICATIONS

None

BACKGROUND OF THE INVENTION

1. Field of the Invention

The present invention relates to electronic whiteboards and, more particularly, to a method and apparatus for implementing an electronic whiteboard usable in a virtual environment.

2. Description of the Related Art

Virtual environments simulate actual or fantasy 3-D environments and allow for many participants to interact with each other and with constructs in the environment via remotely-located clients. One context in which a virtual environment may be used is in connection with gaming, although other uses for virtual environments are also being developed.

In a virtual environment, an actual or fantasy universe is simulated within a computer processor/memory. Multiple people may participate in the virtual environment through a computer network, such as a local area network or a wide area network such as the Internet. Each player selects an "Avatar" which is often a three-dimensional representation of a person or other object to represent them in the virtual environment. Participants send commands to a virtual environment server that controls the virtual environment to cause their Avatars to move within the virtual environment. In this way, the participants are able to cause their Avatars to interact with other Avatars and other objects in the virtual environment.

A virtual environment often takes the form of a virtual-reality three dimensional map, and may include rooms, outdoor areas, and other representations of environments commonly experienced in the physical world. The virtual environment may also include multiple objects, people, animals, robots, Avatars, robot Avatars, spatial elements, and objects/environments that allow Avatars to participate in activities. Participants establish a presence in the virtual environment via a virtual environment client on their computer, through which they can create an Avatar and then cause the Avatar to "live" within the virtual environment.

As the Avatar moves within the virtual environment, the view experienced by the Avatar changes according to where the Avatar is located within the virtual environment. The views may be displayed to the participant so that the participant controlling the Avatar may see what the Avatar is seeing. Additionally, many virtual environments enable the participant to toggle to a different point of view, such as from a vantage point outside of the Avatar, to see where the Avatar is in the virtual environment.

The participant may control the Avatar using conventional input devices, such as a computer mouse and keyboard. The inputs are sent to the virtual environment client which forwards the commands to one or more virtual environment servers that are controlling the virtual environment and providing a representation of the virtual environment to the participant via a display associated with the participant's computer.

Depending on how the virtual environment is set up, an Avatar may be able to observe the environment and optionally also interact with other Avatars, modeled objects within the virtual environment, robotic objects within the virtual environment, or the environment itself (i.e. an Avatar may be allowed to go for a swim in a lake or river in the virtual environment). In these cases, client control input may be permitted to cause changes in the modeled objects, such as moving other objects, opening doors, and so forth, which optionally may then be experienced by other Avatars within the virtual environment.

"Interaction" by an Avatar with another modeled object in a virtual environment means that the virtual environment server simulates an interaction in the modeled environment, in response to receiving client control input for the Avatar. Interactions by one Avatar with any other Avatar, object, the environment or automated or robotic Avatars may, in some cases, result in outcomes that may affect or otherwise be observed or experienced by other Avatars, objects, the environment, and automated or robotic Avatars within the virtual environment.

A virtual environment may be created for the user, but more commonly the virtual environment may be persistent, in which it continues to exist and be supported by the virtual environment server even when the user is not interacting with the virtual environment. Thus, where there is more than one user of a virtual environment, the environment may continue to evolve when a user is not logged in, such that the next time the user enters the virtual environment it may be changed from what it looked like the previous time.

As Avatars encounter other Avatars within the virtual environment, the participants represented by the Avatars may elect to communicate with each other. For example, the participants may communicate with each other by typing messages to each other or the participants may be allowed to talk with each other via the virtual environment.

Virtual environments are commonly used in on-line gaming, such as for example in online role playing games where users assume the role of a character and take control over most of that character's actions. In addition to games, virtual environments are also being used to simulate real life environments to provide an interface for users that will enable on-line education, training, shopping, workplace collaboration, and other types of interactions between groups of users and between businesses and users.

One emerging use of virtual environments is in a business context. People at geographically distant locations or even in adjacent offices may log into a virtual environment to conduct meetings or otherwise interact with each other. In this context, the virtual environment may be created to mimic a workplace and include features such as conference rooms, lecture halls, private offices, open space, and other features commonly found in a business setting. For example, an enterprise may establish a virtual environment that will enable employees to interact with each other so that the employees may collaborate more effectively.

People meet in a business context for many different reasons, either in-person or remotely by telephone. As virtual environments are developed and proliferate, meetings likewise may be expected to be hosted by the virtual environments. Generally, a business meeting will have an agenda. Since people may be distracted and unfocused, various business tools have been developed to help lead business meetings to help participants stay focused on the intended topic. Examples of business tools of this nature include whiteboards and flip charts. These business tools, when properly used, can help focus a group of people on a small set of topics by providing a way for the moderator of the meeting to keep returning the participants' attention to the main theme of the meeting. For example, by interrupting and requesting a person to succinctly state their thought, and then writing the thought on the whiteboard, the moderator may focus the person's attention and return to the main objectives of the meeting. Whiteboards may also be used to enable people to brainstorm solutions to a particular problem, vote on the various solutions, and otherwise record the content of the meeting. Myriad uses for whiteboards have and may be developed.

When people are not physically present, and are meeting either by telephone or in a virtual context, they similarly need guidance to help focus on the intended topic. Accordingly, electronic whiteboard applications have been developed. Unfortunately, drawing on an electronic whiteboard is not as easy as drawing on a wall-mounted whiteboard or chart. For example, most electronic whiteboard applications require the user to use a computer mouse to draw on the whiteboard. Drawing using a mouse is fairly difficult to master, since a mouse is an indirect input device. Thus, many users are less than adept at creating line drawings using their mouse which may detract from the flow of the meeting. Additionally, mouse-drawn or hand-drawn shapes tend to be pixel-based drawings, which are hard to change once rendered Some whiteboards attempt to overcome this limitation by providing a palate of shapes that people may select and drop onto the whiteboard. For example, a user may select a rectangle shape and drop it onto the whiteboard. The use of pre-drawn figures (editable objects) enables anyone using the whiteboard to accurately draw the particular figure associated with the selected icon. Unfortunately, although this type of palate based tool is useful, people tend to try to adjust the size and position of the resultant shape to get the shape to be perfect on the whiteboard. Spending time on unimportant details of this nature also detracts from the flow of the meeting.

SUMMARY OF THE INVENTION

An electronic whiteboard may be used as a shared application which may be viewed and interacted with by participants over a network. The electronic whiteboard has a palate of tools that enable users to quickly draw shapes on the whiteboard. Rather than using perfectly drawn shapes, however, the palate renders shapes that are not quite perfect—rectangles that are not quite square, lines that are not quite straight—to prevent users from focusing on getting the drawings perfect. A randomizing function may be used as well to cause the objects to be somewhat different each time they are drawn. This lends an informal feeling to the resulting drawings to allow the drawings to more closely simulate how drawings would appear on a traditional whiteboard. Similarly, text is rendered using a scripted font rather than type font to make words on the whiteboard appear to be handwritten. The letters used to form the text and the lines on which the text is formed may also be passed through the randomizing function to cause the text to more closely simulate hand-drawn letters.

Users are provided with the ability to add notes to particular areas of the whiteboard and to vote on items shown on the whiteboard. A note organization tool enables the notes to be organized and grouped to manage the notes that are added to the whiteboard. A vote counting tool enables the votes to be tallied automatically without requiring a manual recount of votes. As users add content to the whiteboard, a recording of who added particular content may be taken. This recording may be integrated with other minute taking tools and audio recording tools to enable the flow of the meeting to be recreated at a later point in time. Snapshots of the whiteboard may be taken at predetermined intervals, on demand, or otherwise, to enable images from the whiteboard to be made available as well. The whiteboard may be used by itself or may be used in a three dimensional virtual environment.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
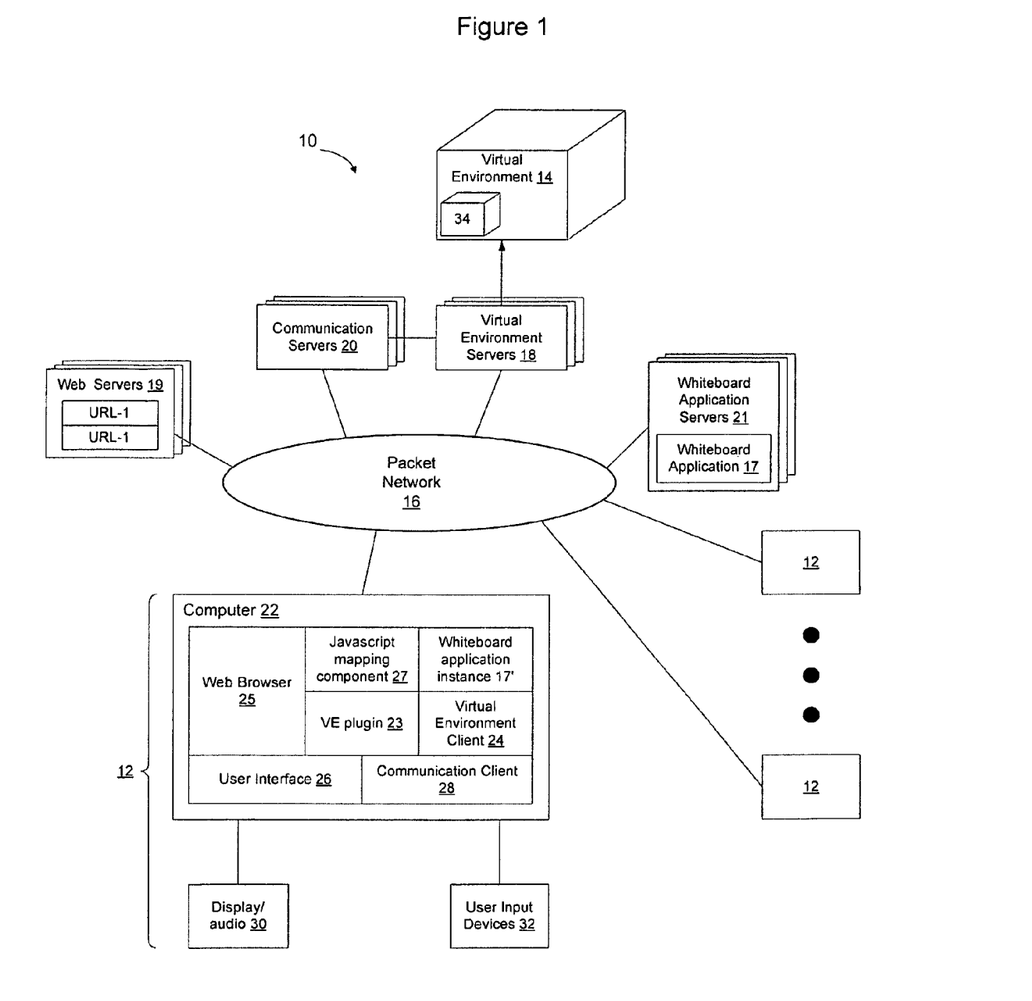
FIG. 1 is a functional block diagram of a portion of an example system that may be used to enable multiple users to access an electronic whiteboard according to an embodiment of the invention.

FIG. 1 shows a portion of an example system 10 that may enable an electronic whiteboard to be utilized in a virtual environment. Although an embodiment will be described in which the electronic whiteboard is used in a virtual environment, the invention is not limited in this manner as the electronic whiteboard may be used in other ways as well. For example, the electronic whiteboard may be made available as a hosted application on the Internet or other communication network, and shared by users during a telephone conference. The electronic whiteboard may also be used for in-person meetings, for example, where one user has a laptop computer connected to a projector, and uses the electronic whiteboard to host the meeting rather than using a standard whiteboard during the meeting. Many uses of the electronic whiteboard application may be developed and, although an embodiment will be described for use in a virtual environment, the invention is not limited to this particular embodiment.

In the example system shown in FIG. 1, a user 12 may access the virtual environment 14 from their computer 22 over a packet network 16 or other communication infrastructure. The virtual environment 14 is implemented by one or more virtual environment servers 18. Communication sessions between the users 12 may be implemented by one or more communication servers 20. Web servers 19 and application servers 21 enable the user's to access web content (URL-1 and URL-2) and hosted applications such as a hosted whiteboard application 17 over the network 16.

The virtual environment may be implemented as using one or more instances, each of which may be hosted by one or more virtual environment servers. The virtual environment 14 may be any type of virtual environment, such as a virtual environment created for an on-line game, a virtual environment created to implement an on-line store, a virtual environment created to implement an on-line training facility, to enable business collaboration, or for any other purpose. Virtual environments are being created for many reasons, and may be designed to enable user interaction to achieve a particular purpose.

A virtual environment is generally implemented to have its own distinct three dimensional coordinate space. Avatars representing users may move within the three dimensional coordinate space and interact with objects and other Avatars within the three dimensional coordinate space. The virtual environment servers maintain the virtual environment and generate a visual presentation for each user based on the location of the user's Avatar within the virtual environment. The view may also depend on the direction in which the Avatar is facing and the selected viewing option, such as whether the user has opted to have the view appear as if the user was looking through the eyes of the Avatar, or whether the user has opted to pan back from the Avatar to see a three dimensional view of where the Avatar is located and what the Avatar is doing in the three dimensional computer-generated virtual environment.

Each user 12 has a computer 22 that may be used to access the three-dimensional computer-generated virtual environment. The computer 22 will run a virtual environment client 24 and a user interface 26 to the virtual environment. The user interface 26 may be part of the virtual environment client 24 or implemented as a separate process. A separate virtual environment client may be required for each virtual environment that the user would like to access, although a particular virtual environment client may be designed to interface with multiple virtual environment servers. A communication client 28 is provided to enable the user to communicate with other users who are also participating in the three dimensional computer-generated virtual environment. The communication client may be part of the virtual environment client 24, the user interface 26, or may be a separate process running on the computer 22.

The user may see a representation of a portion of the three dimensional computer-generated virtual environment on a display/audio 30 and input commands via a user input device 32 such as a mouse, touch pad, or keyboard. The display/audio 30 may be used by the user to transmit/receive audio information while engaged in the virtual environment. For example, the display/audio 30 may be a display screen having a speaker and a microphone. The user interface generates the output shown on the display under the control of the virtual environment client, and receives the input from the user and passes the user input to the virtual environment client. The virtual environment client passes the user input to the virtual environment server which causes the user's Avatar 34 or other object under the control of the user to execute the desired action in the virtual environment. Thus, the user may control a portion of the virtual environment, such as the person's Avatar or other objects in contact with the Avatar, to change the virtual environment for the other users of the virtual environment.

Typically, an Avatar is a three dimensional rendering of a person or other creature that represents the user in the virtual environment. The user selects the way that their Avatar looks when creating a profile for the virtual environment and then can control the movement of the Avatar in the virtual environment such as by causing the Avatar to walk, run, wave, talk, or make other similar movements. Thus, the block 34 representing the Avatar in the virtual environment 14, is not intended to show how an Avatar would be expected to appear in a virtual environment. Rather, the actual appearance of the Avatar is immaterial since the actual appearance of each user's Avatar may be expected to be somewhat different and customized according to the preferences of that user. Since the actual appearance of the Avatars in the three dimensional computer-generated virtual environment is not important to the concepts discussed herein, Avatars have generally been represented herein using simple geometric shapes or two dimensional drawings, rather than complex three dimensional shapes such as people and animals.

The user's computer 22 may also include a JavaScript mapping component 27 designed to enable events in the virtual environment to be mapped to a JavaScript function exposed by the web browser. Similarly, the JavaScript mapping function enables input from the web browser, such as input from a whiteboard application instance 17', to be passed to a virtual environment plug-in 23, so that interaction with web content or applications running in a web browser 25 can cause particular actions to occur within the virtual environment. Enabling the applications to be run in a web browser rather than in the virtual environment enables common web-based applications such as the whiteboard application 17 available on the network via whiteboard application server 21 to be integrated into the virtual environment 14. Where the whiteboard application is implemented as an application other than a web based application, portions of the whiteboard application may be embedded in the virtual environment to enable the whiteboard application to run within the virtual environment. The whiteboard function may also be incorporated into the virtual environment using OLE or another technique, or may be written to be integrated into the virtual environment application code.

Figure 2:
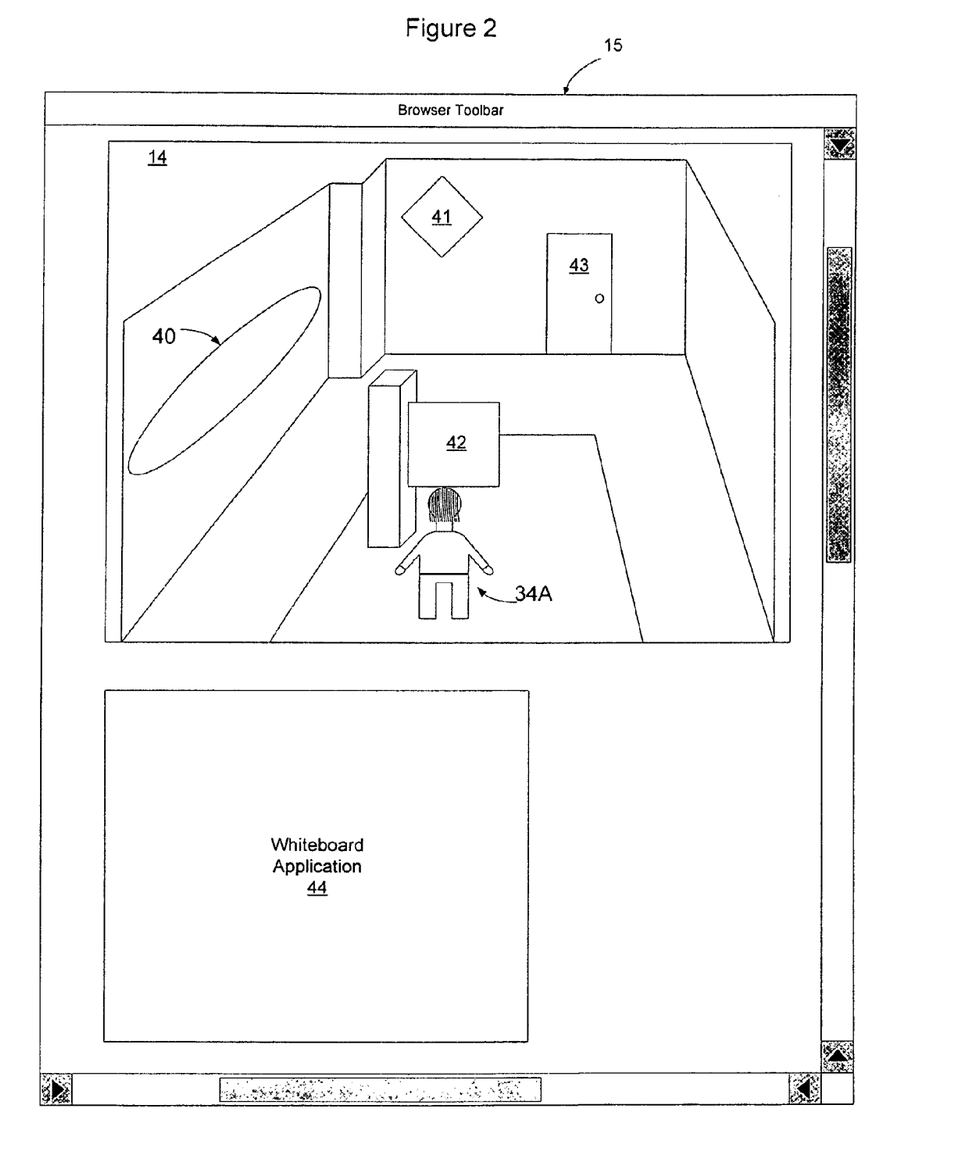
FIG. 2 is a block diagram showing an example web browser running a whiteboard application and an embedded virtual environment according to an embodiment of the invention.
Figure 4:
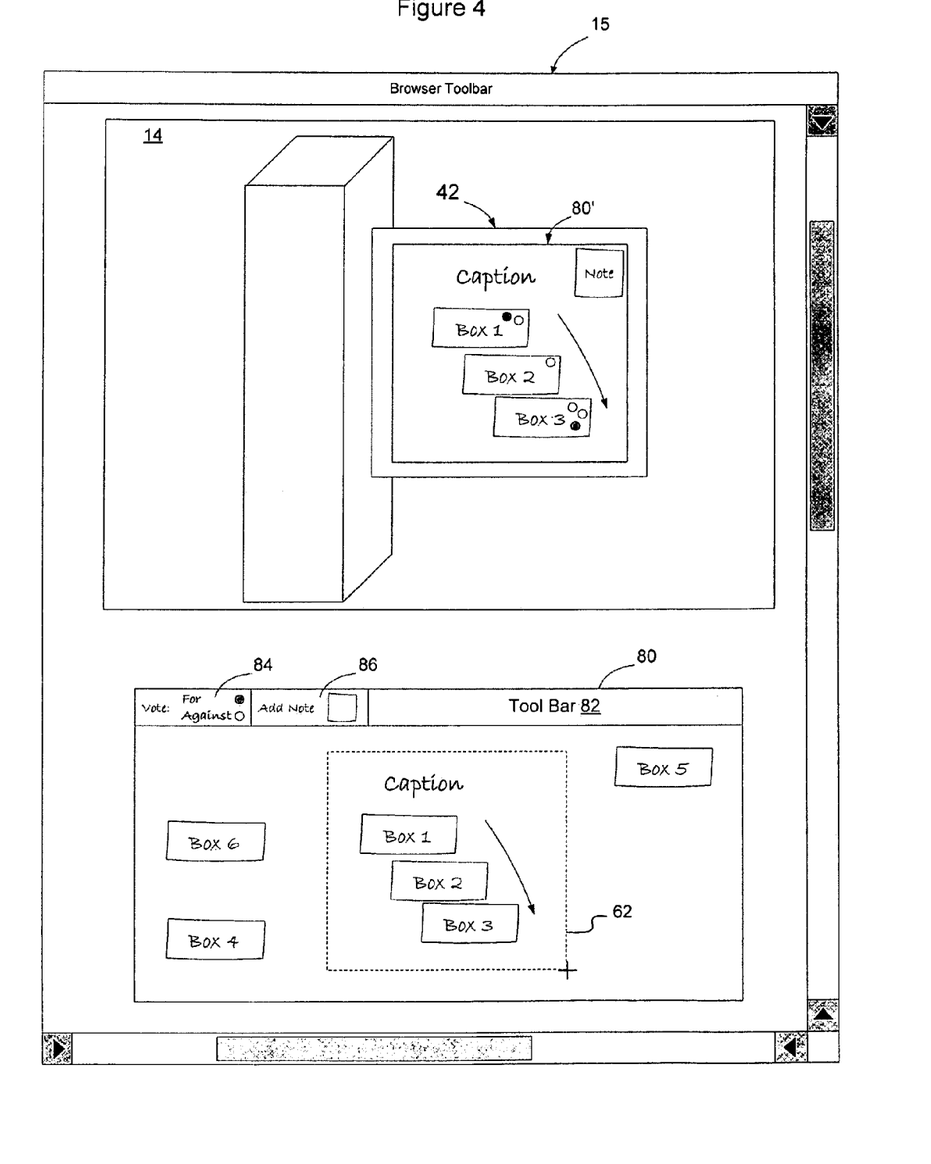
FIG. 4 is a block diagram showing an example whiteboard display in a virtual environment and associated whiteboard work area according to an embodiment of the invention.

FIG. 2 shows an example three dimensional computer-generated virtual environment. In the example shown in FIG. 2, an Avatar 34A is shown standing in front of a sign 42 that is attached to a post. The user may use the user interface 26 to cause the Avatar to walk around within the virtual environment to approach objects within the virtual environment. For example, the user may cause the Avatar to walk up to the sign, may cause the Avatar to walk over to the oval-shaped window 40, to move toward the diamond-shaped window 41, door 43, or elsewhere in the virtual environment. The user may be presented with a view of the virtual environment that is set back from the Avatar (as shown in FIG. 2) to see where the Avatar is located within the virtual environment. Alternatively, the user may be presented with a view that represents what the Avatar is seeing in the virtual environment, as if the user were looking through the Avatar's eyes into the virtual environment (FIG. 4). The view of FIG. 4 is thus what the Avatar 34A is seeing when standing as shown in FIG. 2.

In the example shown in FIG. 2, the three dimensional computer-generated virtual environment is embedded in a browser window 15 supported by web browser application 25. According to an embodiment of the invention, as the user manipulates their Avatar within the virtual environment, particular actions in the virtual environment will cause the content displayed in the browser window 15 to be updated. For example, when the user entered the room and approached the sign, this action may be captured by a trigger to generate an event which may be mapped to a JavaScript function to cause the whiteboard application 44 to be launched in the user's browser. The content of the whiteboard application may be caused to appear on a surface of the virtual environment. For example, the content of the whiteboard may be mapped to the sign 42 in the virtual environment. Actions of this nature may be implemented where the whiteboard is incorporated into the virtual environment or integrated with the virtual environment application as well.

As another example, if the user were to manipulate their Avatar to cause their Avatar to go over to the door 43 and open the door, the act of opening the door (action) could be captured by a trigger to cause the trigger to generate an event. The event may be sent along with parameters to a JavaScript function to cause the whiteboard application 44 to close, so that the content of the whiteboard is no longer shown on the sign 42. This enables the three dimensional surface free for use by other users who may want to use a whiteboard application in the virtual environment. Actions of this nature may be implemented where the whiteboard is incorporated into the virtual environment or integrated with the virtual environment application as well.

In another embodiment, the whiteboard application may be implemented as a separate application and embedded to run within the virtual environment. In this way, rather than running in parallel with the virtual environment in a web browser, the whiteboard application may run inside the virtual environment. Object Level Encoding (OLE) is commonly used to embed portions of one application inside another application, which may be used to embed a stand-alone whiteboard application inside a virtual environment application. Additionally, the whiteboard function may be integrated into the code of the virtual environment application.

Regardless of how the whiteboard application and virtual environment are configured to work together, the user may use the whiteboard application 44 to cause content to be shown in the virtual environment. As the user selects shapes, draws free-hand objects, and adds text to the whiteboard application 44, the content will appear on the associated surface in the virtual environment. Thus, where the associated surface is the sign 42, the content of the whiteboard will appear on the sign 42. Optionally, as content is changed, the Avatar associated with the user who has made the change may be caused to appear to draw on the virtual whiteboard in the virtual environment with a virtual marker.

Figure 3:
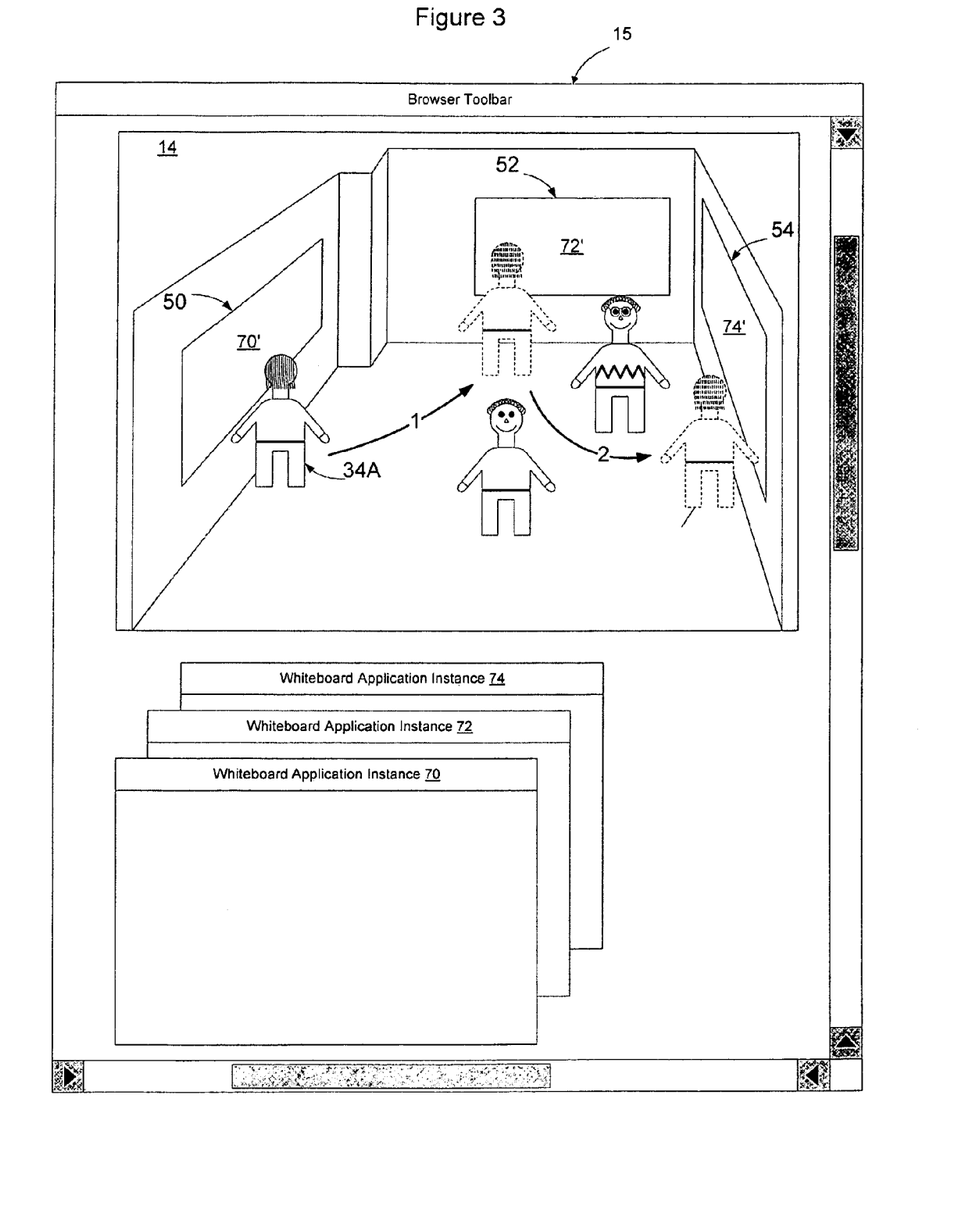
FIG. 3 is a block diagram showing an example web browser running several instances of a whiteboard application and an embedded virtual environment according to an embodiment of the invention.

FIG. 3 shows an example virtual environment in which there are three whiteboards areas 50, 52, 54 in a particular room in the virtual environment. In the example shown in FIG. 3, the user is represented by an Avatar 34A. Assume initially that the user's Avatar was positioned in front of a whiteboard area 50 on the left side wall of the virtual environment. A whiteboard application instance 70 associated with whiteboard content 70' may be brought to the front in the user's browser to enable the user to interact with the content of that whiteboard. Then, assume that the user were to navigate their Avatar as shown using arrow 1 so that the Avatar is positioned in front of a whiteboard area 52 on the back wall. When the Avatar gets sufficiently close to the new whiteboard area, a whiteboard application instance 72 associated with whiteboard content 72' may be brought to the front in the user's browser to enable the user to interact with the content of that the new whiteboard. Similarly, if the Avatar were to walk as shown by Arrow 2, to the whiteboard area 54, the whiteboard application instance 74 associated with whiteboard content 74' may be brought to the front to enable the user to work on that particular whiteboard.

The Avatar may be caused to appear to be writing on the whiteboard when the user associated with the Avatar is adding content to the whiteboard, so that other users know who is updating the whiteboard. Other animations may be used as well depending on the capabilities of the particular virtual environment.

The positions of the Avatars in the virtual environment may be used to control who is able to draw on the whiteboard. For example, a person presenting to a group or moderating a meeting may want to control what content is put up on a whiteboard. By keeping other Avatars away from the whiteboard, those people may be prevented from drawing on the whiteboard or otherwise contributing content to the whiteboard. Thus, in one embodiment, an Avatar may need to be one arms length away from the whiteboard before the Avatar is allowed to draw on the whiteboard. Requiring the user's Avatar to be next to the whiteboard enables existing social conventions around whiteboard use to be implemented in the virtual environment and makes the virtual environment collaborative experience more approximate that of the real world. If someone has a contribution that the presenter would like to have included on the whiteboard, the presenter may invite the other person to move their Avatar forward to enable the new person to obtain access to the whiteboard application. Optionally, the whiteboard may limit the number of users that can modify the whiteboard at any particular point in time. For example, only one, two, or other small number of users may be allowed to simultaneously modify the whiteboard.

Depending on the embodiment, users may be allowed to add notes or votes to the whiteboards without being within the range required to add content to the whiteboards. Thus, although users may not be able to contribute content to the whiteboard, other features associated with the whiteboard may be available to those users. For example, the users may be allowed to vote on particular items, may be allowed to make notes, or otherwise continue to contribute to the meeting.

The electronic whiteboard may be placed on any surface in a virtual environment. For example, walls, ceilings, objects, other Avatars, objects that look like whiteboards, flip charts, etc. Double-sided whiteboards can be placed on glass surfaces such that they can be used from both sides. Whiteboards may be simultaneously displayed on more than one surface to allow a greater number of users to access the whiteboards. Where this is implemented, it may be desirable to enable only one surface of the whiteboard to be writable at any particular point in time.

Whiteboards may have multiple layers of content. For example, a background document may be placed on the whiteboard and then one or more layers of content may be written over the background layer. The layers may be peeled off and viewed independently or may be removed as a group as needed. The whiteboard may also enable the layers to be successively added or removed to enable the full content of the whiteboard to be successively built over the background document. Additionally, users may turn layers on or off and adjust the transparency of particular layers to enable different features added to the whiteboard session to be highlighted or pushed to the background.

Whiteboards in the virtual environment may be limited to one particular surface or, if desired, may span several surfaces. Users may move their Avatars to address different whiteboard surfaces or, alternatively, may move the whiteboard surfaces within the virtual environment. For example, the whiteboard surface may be placed on an object representing a sliding whiteboard. The user may slide the whiteboard surface to reveal a blank surface or, if that surface has already been used, to show the content of that surface once again. Whiteboard surfaces may also be rotated, flipped, or moved in other ways. For example, where the whiteboard is implemented on an object representing a flip chart, content may be added to the pages of the flip chart which may then be torn off and hung around a room in the virtual environment or may be flipped over successively while remaining attached to the flip chart. Users may select between pages via thumbnail views, by having the pages in separate windows, or in another desired way.

Where the content spans multiple surfaces or multiple layers of a particular surface, the content may be selected and transferred between pages. For example, a user may use a lasso and drag/drop gesture or cut and paste gesture to move content from one page/layer to another page/layer. Other ways of moving content may be used as well.

Thus, as discussed above in connection with FIG. 2, the position and actions of the Avatars within the virtual environment can cause whiteboard applications to open and close. Additionally, as discussed in connection with FIG. 3, the position and actions of the Avatars may cause different whiteboard application instances to be active or tiled to the front so that the user can automatically interact with the correct whiteboard application. Similarly, if desired, by clicking on a whiteboard application the Avatar's attention may be automatically directed to the proper whiteboard so that the user can see, in the virtual environment, which whiteboard in the virtual environment is associated with which whiteboard instance running on the user's computer.

The user's interaction with the three dimensional virtual environment may be monitored by triggers to look for specific actions in the virtual environment. Examples of possible actions include when a user enters or leaves a region in the virtual environment (i.e. the user enters/leaves a room); the user approaches a surface containing whiteboard content, the user clicks on an object; the user invokes a control feature to enable their Avatar to take special action within the virtual environment; or the user starts/stops/updates content mapped to a surface of the virtual environment. Other actions may be captured as well, and this list is merely meant to show several examples of possible actions.

If the whiteboard application is a web based application, upon occurrence of an action, a trigger in the virtual environment will generate an event which will be provided to a mapping component 27 to map the event to a JavaScript function. Parameters associated with the event will be passed to the JavaScript function to enable the JavaScript function to call different sub-functions within the web browser. For example, assume that a user enters a particular room that has a wall on which a whiteboard application is available. Entry into the room may be captured by a trigger in the virtual environment to cause the trigger to generate an event. The event type and other parameters will be passed to the JavaScript function. The parameters associated with the event will be passed along with the event type to cause the JavaScript function to call a second JavaScript function that will cause a whiteboard application to be launched in the user's browser. Similarly, walking up to the surface or clicking on the surface may enable the user to take control of the whiteboard to add content to the whiteboard. Alternatively, clicking on the surface may enable the user to take actions on the whiteboard such as to vote on particular items shown on the whiteboard, without allowing the user to contribute content to the whiteboard. Many different actions may be captured to enable the actions to be mapped from the virtual environment to particular functions in the electronic whiteboard application.

Where the whiteboard application is a separate application, and not a web-based application, the whiteboard application may be integrated into the virtual environment application. Object Linking and Embedding (OLE) is commonly used to embed portions of applications into other applications. The whiteboard application may be embedded into the virtual environment to enable the users of the virtual environment to interact with the whiteboard application directly.

FIG. 4 shows an example in which content 80' of whiteboard application 80 has been mapped to a surface 42 in a three dimensional virtual environment. In the embodiment shown in FIG. 4, the boxes rendered on the whiteboard are based on selectable objects and, hence, are easily modified on the whiteboard. The objects have intentionally not been drawn with perfectly straight lines or with perfectly square corners so that they are not amenable to being perfectly aligned and organized on the whiteboard. For example, the rectangles shown as implementing boxes 1-6 of the whiteboard 80 are all the same, yet not perfect in-so-much as the shapes do not have two sets of parallel sides and right angles. Rather, the lines are somewhat bent, of different lengths, and the angles are somewhat other than 90 degrees, to make the object appear closer to being hand-drawn than computer-drawn. The lines may also have varying thickness, intensity, and color, to make the lines appear more like hand-drawn lines. By making the objects less than perfect, the users of the whiteboard application will be less tempted to waste time adjusting the figures to perfect the drawings so that this type of time-consuming exercise is less likely to interrupt the flow of the meeting.

The whiteboard may also include a randomizing function 125 to enable an object selected from the toolbar to be drawn differently each time it is selected. The randomizing function enables the objects drawn to be similar in size and shape, yet different enough to cause each object to appear different to people viewing the whiteboard. The randomizing function may cause different angles to be drawn, vary the thickness and darkness of the lines, cause different lines to be more or less curved/straight, or otherwise cause the shapes to be different. However, each object is still object-based which means that it is able to be selected and manipulated, i.e. resized, easily.

Figure 6:
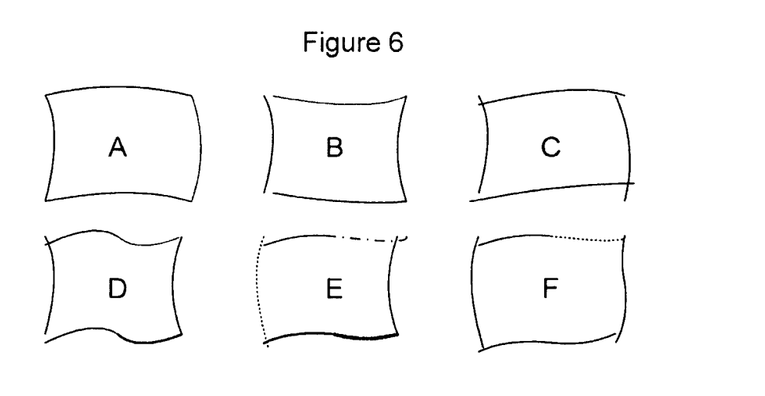
FIG. 6 shows a series of shapes drawn by selecting one object from a palate of objects after the shape has been passed through a randomizing function.

FIG. 6 shows an example of how the same shape, a rectangle shape, may be altered in subsequent iterations such that it can be drawn differently on the whiteboard. As shown in FIG. 6, each iteration (A-F) is different, yet approximately the same shape. This gives the whiteboard drawn using those shapes a casual feel to enable the content to be imprecisely drawn so that users do not focus on precisely sizing and aligning the shapes, but rather can focus instead on the content of the meeting. The object may be drawn using lines that vary in thickness, darkness, may wobble, or include other effects to make the drawing appear on the whiteboard in a manner that is more akin to how a person may draw the object using a marker on a physical whiteboard. However, despite the randomized nature of the outline of the appearance of the object, the object is still object-based such that it can be manipulated similar to other objects. Thus, for example, the object may be dropped onto the whiteboard, moved within the whiteboard, resized, rotated, and otherwise manipulated as a normal object in a graphics program.

Not only shapes, but also text may be passed through the randomizing function 125 prior to appearing on the whiteboard. In this embodiment, the font is passed through a randomizing function that adds imperfections to the font script.

Thus, rather than drawing letters consistently, the letters may be rendered with less than perfect lines, circles, arcs, etc. to give the text more of a hand-drawn feeling. Similarly, spacing between characters may be randomized slightly to make the letters closer together or farther apart to give the text more of a hand-drawn feeling, while still enabling the text to be easily readable to the users. Where the text is to be drawn on a line to appear on the whiteboard, the line on which the text is drawn may similarly be passed through the randomizing function so that the line of text is not perfectly straight. This enables some letters to be placed somewhat above the line and other letters to be placed somewhat below the line to make the text appear to be hand-drawn.

FIG. 4 also shows several other aspects of the whiteboard, which is the ability of users to add notes and to vote on particular items shown on the whiteboard. Specifically, as shown in FIG. 4, the toolbar 82 of the whiteboard application 80 includes a vote tool 84 and a note tool 86. Users may use the vote and note tools even if they are not located within arm-length of the whiteboard. For example, if the user's Avatar is too far away from the whiteboard to affect the content, the user may vote on the content by clicking on the whiteboard content in the virtual environment or interacting with the whiteboard application 80 running on their computer.

Notes may be anchored to objects on the whiteboard, a whiteboard layer, or the background document. The anchor point selection may be indicated by a feedback icon such as by showing a semi-transparent note-shaped icon over the content. The object where the note will be anchored may also be highlighted if desired as the note is dragged across the whiteboard to enable the user to select the correct object for the note. The anchor points within an object may be intrinsically selected and, optionally, modifier keys may be used to select alternate anchor points when the intrinsic selection fails. Notes may be searched for content, based on anchor point, based on object type, and in myriad other ways.

Note organizing tools are provided to allow notes to be grouped, hierarchically if desired. For example, notes may be grouped by subject, keyword, color, author, manually, or in other desired manners. Hierarchical grouping may be implemented as well, such as to group all yellow notes and then have subgroups by subject, author, keyword, etc. Clusters of notes associated with a particular object or other item on the whiteboard may automatically form a group. Lassos and other multi-selection mechanisms may be used to manually create groups as well. Groups can be collapsed into a single group note with a different visual appearance in order to reduce visual noise. Group notes may be expanded if desired as well.

Notes can be colored, have different shapes, be anchored to different parts of objects, or otherwise distinguished to enable different types of notes to be added to the whiteboard. For example, red notes may be used to indicate action items, green notes may be used to indicate closed items, and yellow notes may be used to indicate questionable areas where further information is needed before a decision can be made. Of course, this example system may be adjusted as desired so that any number of different color notes may be used for any number of different types of content. Similarly note shape and note attachment point may signify the type of note to enable different types of notes to be treated differently by the electronic whiteboard. The electronic whiteboard may automatically filter notes according to the attributes of the note (size, color, attachment point, owner), and may be used to generate reports during or after the meeting.

The whiteboard also supports voting, by allowing users to vote for or against something expressed in a note, object, or otherwise on the whiteboard. For example, as shown in FIG. 4, the whiteboard application may include a vote tool 84 that enables the user to grab a "for" vote object or an "against" vote object and place the object on the desired object on the whiteboard. Other vote objects may be provided as well, such as an abstain object or a conditional vote object. The vote object is similar to a note object. Accordingly, the vote object may be attached to different areas and may also have different attributes associated with it.

Multiple voting schemes may be supported. For example, each user may be allowed only a limited number of votes, different users may be allowed to vote different numbers of times, the votes may be ranked so that the votes are not all of equal weight, a maximum number of votes may be allowed per item, etc. Additionally, voting may be conditional if desired such that a user may vote YES on a particular item only if the group adopts another proposal. Thus, users may condition their votes on other actions by tying votes together. Voting may be named such that the user's name appears on the vote or, if desired, may be anonymous. Where the whiteboard is under the control of one user, that user may open the voting on a particular item and similarly may prevent voting on other items. Users may be able to withdraw votes as well or change votes using the vote tool.

In one embodiment, the electronic whiteboard application may count votes and display the results of the vote counts as desired, either during the meeting or in summary form after conclusion of the meeting. The results may be displayed to all users, to a select group of users, to one user such as the user moderating the meeting and controlling the content of the whiteboard, or to no users until the end of the meeting. Other ways of handling vote counting and reporting may be implemented as well.

As content, notes, and votes, are added to the whiteboard, the history of user actions is recorded. Entire whiteboard sessions may be recorded and replayed as desired. For example, Digital Video Recording enables live video to be recorded, buffered, and then re-wound to replay particular portions or the entire live video. Similar technology may be used by the whiteboard application to record whiteboard sessions. Since there may be times when the whiteboard is not being modified, gaps in time when no content updates, notes, or votes occur, may be omitted to decrease the amount of time it takes to replay a recorded whiteboard session.

As content is added to the whiteboard or while the whiteboard session is being replayed, a snapshot of the whiteboard may be obtained and passed to the users. For example, the content of the whiteboard at that particular point in time may be mapped to another page to enable one or more users to have access to that particular version of the content. Similarly, markers may be added to the whiteboard to indicate important points during the whiteboard session.

Snapshots of the whiteboard may be formatted to be ported into other applications that may be running on the user's computer. Similarly, the snapshots may be integrated with electronic minute taking tools to ensure that snapshots are appropriately interleaved into the minutes of the meeting. For example, a whiteboard history file may be created by causing markers to be automatically added to the whiteboard session as minute items are generated, so that whiteboard snapshots may be obtained that align with the minutes.

As noted above, one feature of the whiteboard application is an ability of the whiteboard application to create content easily, yet informally, to enable the whiteboard to present the appearance of hand-drawn content, yet enable the content to be object-based so that the objects may be manipulated and processed by the whiteboard application.

The whiteboard application supports many types of input from many types of input devices. Example types of input devices may include direct input devices such as a touch screen or light pen, and indirect input devices such as a computer mouse or touchpad. The whiteboard may automatically detect the input device and select the best default input model. For example, direct input devices are good for freehand painting and writing. When the whiteboard application detects input from one of these devices it may automatically select to enable freehand input to create a path object so that the user may write directly to the whiteboard. By contrast, if the whiteboard application detects input from a computer mouse or touchpad, it may automatically default to an object-based input model to enable the user to select an object to be added to the whiteboard. Example objects include rectangles, circles, lines, etc.

Figure 5:
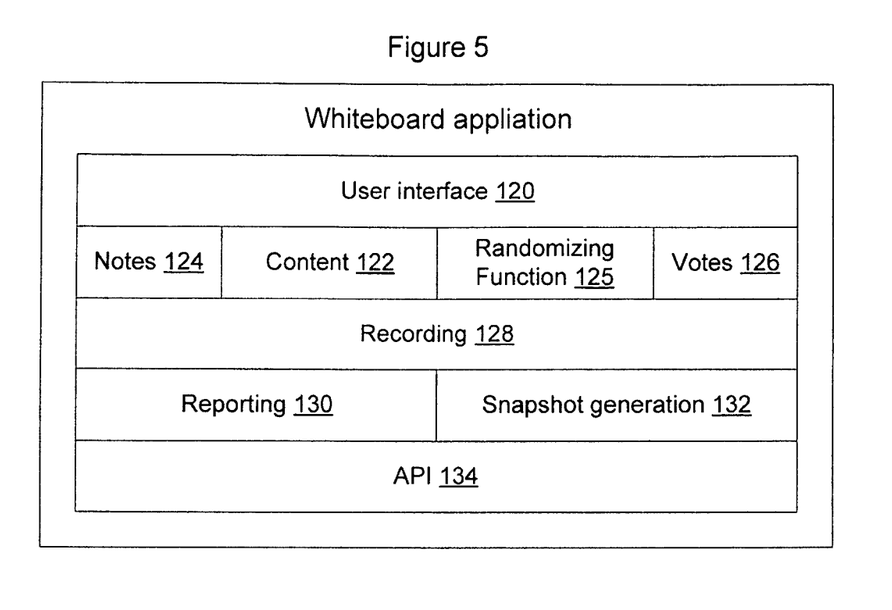
FIG. 5 shows an example software implementation of a whiteboard application according to an embodiment of the invention.

FIG. 5 shows an example software implementation of a whiteboard application according to an embodiment of the invention. The software may contain data and instructions and be stored on a computer readable disk. When the software is loaded into a computer, the data and instructions configure the hardware of the computer to enable the computer to implement the functions described above.

In the embodiment shown in FIG. 5, the whiteboard application software has a user interface module 120 that will enable the whiteboard application to generate an user interface, and receive input from the user. The whiteboard application also has a content module 122 that enables the whiteboard to display content that has been added to the whiteboard and otherwise display the content to the user as described in greater detail above. A randomizing module 125 is provided to randomize objects selected by the user before drawing the objects on the whiteboard. The randomizing module 125 also randomizes text before showing the text on the whiteboard.

The whiteboard application software has note module 124 that enables users to add notes to the content and search the content of notes that have been added. The note module is responsible for enabling notes to be added to the content and also for sorting, grouping, searching, and otherwise organizing the notes. Similarly, the whiteboard application software has a vote module 126 that enables users to vote on the content, establishes and enforces rules about how voting should be implemented during a particular whiteboard session, and that counts and provides reports about vote items.

The whiteboard application software includes a recording module 128 that enables whiteboard sessions to be recorded and, as desired, replayed. The recording module 128 interfaces with a reporting module 130 that enables reports to be created from the whiteboard session. Example reporting module output includes vote tallies, note summaries, and other similar statistics. A snapshot generation module 132 works in connection with the reporting module to generate snapshots of the content from whiteboard sessions.

In FIG. 5, the whiteboard application also includes one or more application programming interfaces 134 to enable the whiteboard to interact with other applications running on the user computer. For example, the whiteboard application may interact with a minute taking software application to enable snapshots from the whiteboard session to be keyed to minutes generated using the minute taking software application. Similarly, the reporting module 130 may sense when users add particular types of markers to the content, and use the marker input to cue both the snapshot generation module and the minute taking software application (via the API 134) to cause the minute taking software application to add a minute at that particular point in time. Other types of interactions may be implemented as well.

Where the whiteboard application software is running outside of the virtual environment, the API 134 may also be configured to enable the whiteboard application software controls to be received from and passed to other applications. For example, the API 134 may enable control instructions to be passed to the virtual environment client to enable actions to be taken in the virtual environment, and to enable control instructions to be passed from the virtual environment client to the whiteboard to enable actions taken in the virtual environment to be passed to the whiteboard application. Many examples of how user action in the virtual environment may cause a whiteboard application to start, stop, suspend action, enable particular features, etc., have been provided above.

Although particular modules and pieces of software have been described in connection with performing various tasks associated with an electronic whiteboard application, the invention is not limited to this particular embodiment as many different ways of allocation functionality between components of a computer system may be implemented. Thus, the particular implementation will depend on the particular programming techniques and software architecture selected for its implementation and the invention is not intended to be limited to the one illustrated architecture.

The functions described above may be implemented as one or more sets of program instructions that are stored in a computer readable memory and executed on one or more processors within on one or more computers. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a memory chip, computer memory, memory stick, disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A computer-implemented electronic whiteboard display configured to implement a method of enabling network-based collaboration, the method comprising the steps of:
providing an electronic whiteboard area;
enabling a user to add text to the electronic whiteboard area, the text being rendered using a scripted font;
passing the characters of the text through a randomizing function such that different instances of a given character will be slightly different when drawn in the electronic whiteboard area, such that the horizontal spacing between successive characters of the text varies, and such that the vertical spacing of characters within a line of text varies to cause at least some of the characters to be slightly above or below other characters within the line of text, the randomizing function maintaining the legibility of the text but causing the text to appear to be hand-drawn;

enabling a user of the electronic whiteboard to select a generally polygonal shaped object for inclusion in the electronic whiteboard area, the object appearing hand-drawn and being drawn using lines that are not perfectly straight, lines that vary in thickness, intensity, and color, and the object having corners that are not perfectly symmetrical;

passing the object through a randomizing function to create a randomized representation of the object, the randomizing function operating such that successive creations of the randomized representation of the same object will be similar, but drawn such that the successive iterations of the shapes are intentionally not perfectly aligned and such that the not perfectly straight lines are drawn using lines that vary in thickness, intensity, and color and are more or less curved/straight and such that the not perfectly symmetrical corners have slightly different angles so that multiple creations of the same object will cause randomized representations of the same object in the electronic whiteboard area to have different sizes and different shapes enabling the multiple creations of the same object to appear different from each other in the electronic whiteboard area; and drawing the randomized representation of the object on the electronic whiteboard area; and wherein the object is able to be moved, resized, rotated after being drawn on the electronic whiteboard area.

2. The computer-implemented electronic whiteboard display of claim 1, the method further comprising the step of enabling a user to draw a path object on the electronic whiteboard area.

3. The computer-implemented electronic whiteboard display of claim 1, the method further comprising the steps of:
enabling users to add notes to the electronic whiteboard area; and
automatically organizing notes added to the electronic whiteboard area.

4. The computer-implemented electronic whiteboard display of claim 3, wherein the step of automatically organizing notes enables the notes to be grouped by at least one of subject, keyword, color, and author.

5. The computer-implemented electronic whiteboard display of claim 3, wherein the step of automatically organizing notes enables the notes to be grouped hierarchically.

6. The computer-implemented electronic whiteboard display of claim 1, the method further comprising the step of:
enabling users to add votes to the electronic whiteboard area via the computer-implemented electronic whiteboard.

7. The computer-implemented electronic whiteboard display of claim 6, the method further comprising the step of automatically counting votes added to the electronic whiteboard area.

8. The computer-implemented electronic whiteboard display of claim 6, wherein the step of enabling users to add votes enforces a rule which limits each user to only have one vote per user.

9. The computer-implemented electronic whiteboard display of claim 6, wherein the step of enabling users to add votes enforces a rule which limits each user to only have a specified number of votes, the specified number being a number larger than one.

10. The computer-implemented electronic whiteboard display of claim 6, wherein the step of enabling users to add votes enables users to add conditional votes.

11. The computer-implemented electronic whiteboard display of claim 1, wherein the step of providing the electronic whiteboard area is implemented in a three dimensional virtual environment, and wherein the step of enabling is conditional upon an Avatar representing the user being positioned adjacent the electronic whiteboard area in the three dimensional virtual environment.

12. The computer-implemented electronic whiteboard display of claim 1, wherein the step of providing the electronic whiteboard area is implemented in a three dimensional virtual environment, and wherein the electronic whiteboard area is implemented as multiple discrete surfaces within the three dimensional virtual environment.

13. The computer-implemented electronic whiteboard display of claim 12, wherein the whiteboard area spans the multiple discrete surfaces so that the multiple discrete surfaces are treated as being part of a single logical whiteboard.

14. The computer-implemented electronic whiteboard display of claim 13, wherein content may be moved on the single logical whiteboard from one of the multiple discrete surfaces to another of the multiple discrete surfaces within the three dimensional virtual environment.

15. The computer-implemented electronic whiteboard display of claim 6, wherein the step of providing the electronic whiteboard area is implemented in a three dimensional virtual environment, wherein the votes are objects within the three dimensional virtual environment, and wherein a user votes within the three dimensional virtual environment by causing an avatar associated with the user to obtain a vote object and place the vote object on a surface associated with the electronic whiteboard area within the three dimensional virtual environment.

* * * * *